US012654760B2

(12) United States Patent
Kimura

(10) Patent No.: US 12,654,760 B2
(45) Date of Patent: Jun. 16, 2026

(54) STEERING DEVICE AND STEERING CONTROL DEVICE

(71) Applicant: Hitachi Astemo, Ltd., Hitachinaka (JP)

(72) Inventor: Makoto Kimura, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 24 days.

(21) Appl. No.: 18/832,366

(22) PCT Filed: Jun. 21, 2023

(86) PCT No.: PCT/JP2023/022840
§ 371 (c)(1),
(2) Date: Jul. 23, 2024

(87) PCT Pub. No.: WO2024/004772
PCT Pub. Date: Jan. 4, 2024

(65) Prior Publication Data
US 2025/0115286 A1      Apr. 10, 2025

(30) Foreign Application Priority Data

Jun. 30, 2022      (JP) ................................. 2022-105701

(51) Int. Cl.
B62D 5/00           (2006.01)
B62D 5/04           (2006.01)
B62D 15/02          (2006.01)

(52) U.S. Cl.
CPC ............. B62D 5/003 (2013.01); B62D 5/046 (2013.01); B62D 15/0215 (2013.01); B62D 15/0235 (2013.01)

(58) Field of Classification Search
CPC .... B62D 5/003; B62D 5/046; B62D 15/0215; B62D 15/0235; B62D 5/001; B62D 5/0484; B62D 5/04
See application file for complete search history.

(56) References Cited

U.S. PATENT DOCUMENTS

2005/0159866 A1      7/2005  Takeuchi et al.
2018/0229761 A1*     8/2018  Fujita ...................... G01L 5/221
(Continued)

FOREIGN PATENT DOCUMENTS

JP          2004-10024          1/2004
JP          2020-75559          5/2020

OTHER PUBLICATIONS

International Search Report issued Aug. 22, 2023 in International Application No. PCT/JP2023/022840, with English translation.
(Continued)

*Primary Examiner* — Grant Moubry
*Assistant Examiner* — Ruben Picon-Feliciano
(74) *Attorney, Agent, or Firm* — Wenderoth, Lind & Ponack, L.L.P.

(57)                ABSTRACT
A steering device and a steering control device are capable of continuing steering control of steered wheels when a microprocessor on a steering control unit side operates normally at a time of occurrence of a double failure. A first steering angle sensor is configured to output a first operation amount signal to a first steering actuator control unit of a steering control unit, and a second steering angle sensor is configured to a second operation amount signal to a second steering actuator control unit of the steering control unit.

10 Claims, 3 Drawing Sheets

(56)                References Cited

U.S. PATENT DOCUMENTS

| 2019/0367084 | A1* | 12/2019 | Hong | ..................... | B62D 6/008 |
| 2020/0130739 | A1* | 4/2020 | Kodera | ................. | B62D 6/008 |
| 2022/0001916 | A1 | 1/2022 | Kimura et al. | | |
| 2022/0266901 | A1* | 8/2022 | Kim | ....................... | B62D 6/008 |
| 2022/0289282 | A1* | 9/2022 | Narasimhan | ........... | B62D 6/002 |
| 2023/0150570 | A1* | 5/2023 | Wang | ................... | B60R 16/027 |
| | | | | | 701/41 |

OTHER PUBLICATIONS

Written Opinion of the International Searching Authority issued Aug. 22, 2023 in International Application No. PCT/JP2023/022840, with English translation.

* cited by examiner

Fig. 3

| FIRST FAILURE | | SECOND FAILURE | | | | |
|---|---|---|---|---|---|---|
| FAILED PART | CONTROL STATE | FAILED PART | 1st MPU 33 | 2nd MPU 35 | 1st MPU 45 | 2nd MPU 47 |
| 1st MPU 33 | STEERABLE THROUGH TWO SYSTEMS | CONTROL STATE | STEERABLE THROUGH TWO SYSTEMS | STEERABLE THROUGH TWO SYSTEMS | STEERABLE THROUGH ONE SYSTEM | STEERABLE THROUGH ONE SYSTEM |
| 2nd MPU 35 | STEERABLE THROUGH TWO SYSTEMS | | STEERABLE THROUGH TWO SYSTEMS | STEERABLE THROUGH TWO SYSTEMS | STEERABLE THROUGH ONE SYSTEM | STEERABLE THROUGH ONE SYSTEM |

STEERING DEVICE AND STEERING CONTROL DEVICE

CROSS-REFERENCE TO RELATED APPLICATION

The present application claims priority based on Japanese Patent Application No. 2022-105701 filed on Jun. 30, 2022. All disclosed contents including the Specification, Scope of Claims, Drawings, and Abstract of Japanese Patent Application No. 2022-105701 are incorporated herein by reference in their entirety.

TECHNICAL FIELD

The present invention relates to a steering device and a steering control device.

BACKGROUND ART

As a related art, there is known a technology in which control systems for a motor for a steering reaction force and a motor for steering are each divided into two systems in a steering device of a so-called steer-by-wire type in which a steering input mechanism that receives steering input from a driver and a steering mechanism that steers steered wheels are mechanically separated, thereby achieving redundancy.

In JP 2020-075559 A, there is disclosed a steering device in which: a steering input control unit that controls a steering input mechanism and a steering control unit that controls a steering mechanism each have two microprocessors; and of two steering angle sensors that detect an operation angle of a steering wheel, a first steering angle sensor outputs a first operation amount signal to a first microprocessor of the steering input control unit, and a second steering angle sensor outputs a second operation amount signal to a second microprocessor of the steering control unit.

CITATION LIST

Patent Literature

PTL 1: JP 2020-075559 A

SUMMARY OF INVENTION

Technical Problem

However, in JP 2020-075559 A, when there occurs a double failure in which the two microprocessors connected to the steering angle sensors both fail, the steering control unit cannot receive signals from the steering angle sensors. For that reason, there has been a problem in that steering control of the steered wheels cannot be continued even when one microprocessor operates normally in each of the steering input control unit and the steering control unit.

One object of the present invention is to provide a steering device and a steering control device that are capable of continuing steering control of steered wheels when one of microprocessors on a steering control unit side operates normally at a time of occurrence of a double failure.

Solution to Problem

In a steering device according to one embodiment of the present invention, a first operation amount sensor outputs a first operation amount signal to a first steering actuator control unit, and a second operation amount sensor outputs a second operation amount signal to a second steering actuator control unit.

Therefore, in the steering device according to the one embodiment of the present invention, steering control of steered wheels can be continued when one of microprocessors on a steering control unit side operates normally at a time of occurrence of a double failure.

BRIEF DESCRIPTION OF DRAWINGS

FIG. 3 is a table for showing control states of a steering mechanism 4) at times of occurrence of a first failure and a second failure in the steering device 1 according to the first embodiment.

DESCRIPTION OF EMBODIMENTS

First Embodiment

Figure 1:
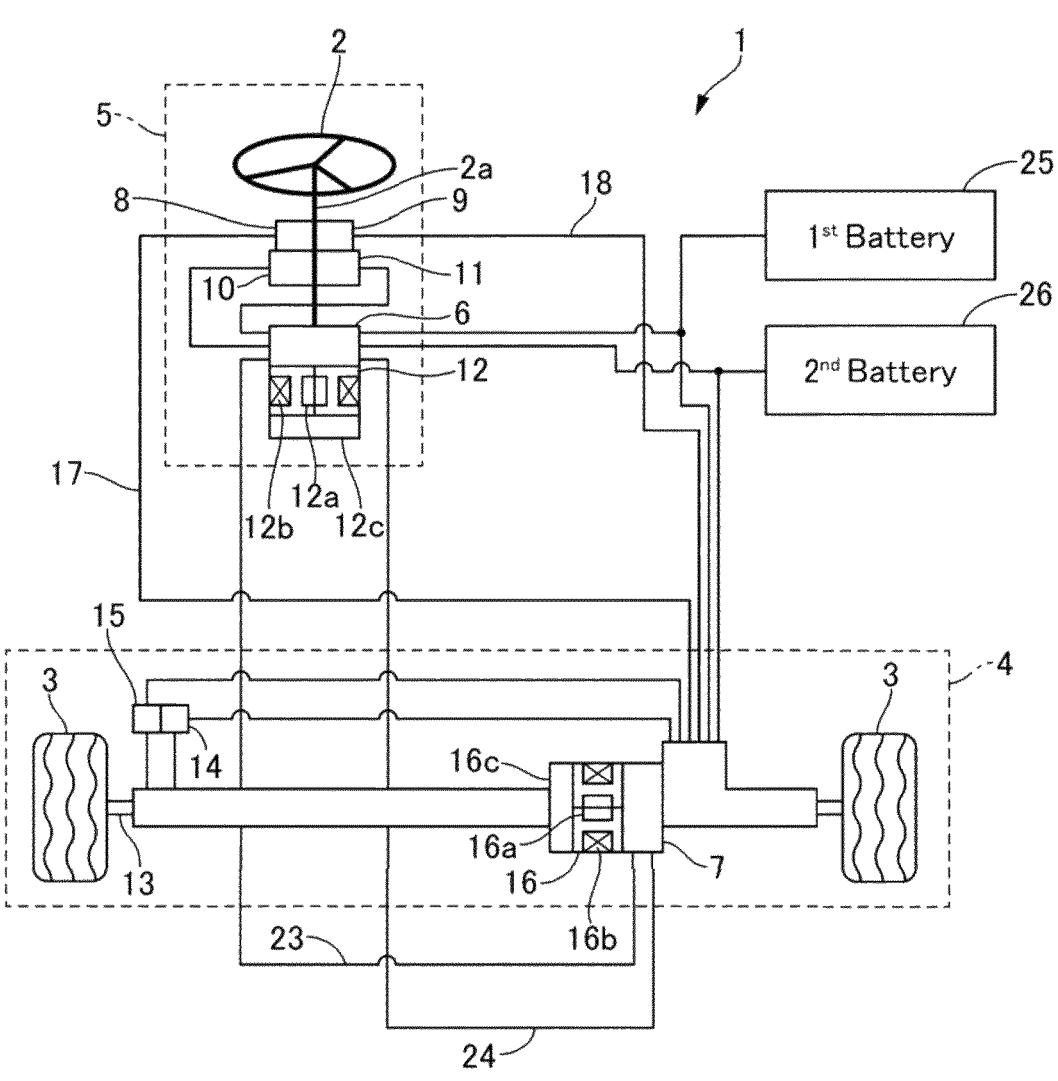
FIG. 1 is a configuration diagram of a steering device 1 according to a first embodiment of the present invention.

FIG. 1 is a configuration diagram of a steering device 1 according to a first embodiment of the present invention.

The steering device 1 is a steering device of a so-called steer-by-wire type in which a steering wheel (operation input member) 2 and a steering mechanism 4 that steers front wheels (steered wheels) 3 are mechanically separated. That is, the steering device 1 is a steering device in which there is no mechanical torque transmission between the steering mechanism 4 and a steering input mechanism 5. The steering device 1 includes the steering input mechanism 5, the steering mechanism 4, a steering input control unit 6, and a steering control unit 7.

The steering input mechanism 5 includes the steering wheel 2, a first steering angle sensor (first operation amount sensor) 8, a second steering angle sensor (second operation amount sensor) 9, a first operation torque sensor 10, a second operation torque sensor 11, and a first electric motor (reaction force actuator) 12. The steering wheel 2 is rotated in response to a steering operation of a driver. The first steering angle sensor 8 is a rotation angle sensor that detects a rotation amount of a steering shaft 2a connected to the steering wheel 2, and outputs a first operation amount signal corresponding to the detected rotation amount. The second steering angle sensor 9 is a rotation angle sensor that detects a rotation amount of the steering wheel 2, and outputs a second operation amount signal corresponding to the detected rotation amount. The first operation amount signal and the second operation amount signal are each an analog signal corresponding to the rotation amount of the steering wheel 2 or a digital signal obtained by encoding the analog signal into a single edge nibble transmission (SENT) message based on a SENT-based short PWM code (SPC) protocol.

The first operation torque sensor 10 detects a steering torque of the driver input to the steering shaft 2a, and outputs a first operation torque signal corresponding to the detected steering torque. The second operation torque sensor 11 detects a steering torque of the driver input to the steering shaft 2a, and outputs a second operation torque signal corresponding to the detected steering torque. The first electric motor 12 is a reaction force actuator that generates a force (steering reaction force) that increases a steering load on the steering wheel 2 in response to the steering operation of the driver. The first electric motor 12 includes a first rotor 12*a*, a first stator 12*b*, and a first-motor rotation angle sensor 12*c*. A coil of the first stator 12*b* is made to be redundant. The first-motor rotation angle sensor 12*c* detects a rotational position of the first rotor 12*a*, and outputs a first-motor rotation angle signal corresponding to the detected rotational position. The first-motor rotation angle sensor 12*c* includes two motor rotation angle sensors 12*c*1 and 12*c*2 (see FIG. 2). The first first-motor rotation angle sensor (first rotation amount sensor) 12*c*1 outputs a first first-motor rotation angle signal. The second first-motor rotation angle sensor (second rotation amount sensor) 12*c*2 outputs a second first-motor rotation angle signal.

The steering mechanism 4 includes a rack bar (steering member) 13, a first rack position sensor (first steering amount sensor) 14, a second rack position sensor (second steering amount sensor) 15, and a second electric motor (steering actuator) 16. The rack bar 13 is movable in a vehicle width direction, and a movement amount thereof is used to steer the front wheels 3. The first rack position sensor 14 detects a position of the rack bar 13, and outputs a first steering amount signal corresponding to the detected position. The rack bar 13 is connected to the front wheels 3 through tie rods or the like, and a steering angle of the front wheels 3 is uniquely determined based on the position of the rack bar 13. Thus, the first steering amount signal is a signal relating to the steering angle of the front wheels 3. The second rack position sensor 15 detects a position of the rack bar 13, and outputs a second steering amount signal corresponding to the detected position. The first steering amount signal and the second steering amount signal are each a digital signal obtained by encoding an analog signal corresponding to the position of the rack bar 13 into a single edge nibble transmission (SENT) message based on the SENT-based short PWM code (SPC) protocol.

The second electric motor 16 is a steering actuator that generates a force for steering the front wheels 3 through the rack bar 13 based on a steering actuator drive signal received from the steering control unit 7. In this embodiment, the second electric motor 16 is a belt-driven rack-assist type steering actuator. The second electric motor 16 includes a second rotor 16*a*, a second stator 16*b*, and a second-motor rotation angle sensor 16*c*. A coil of the second stator 16*b* is made to be redundant. The second-motor rotation angle sensor 16*c* detects a rotational position of the second rotor 16*a*, and outputs a second-motor rotation angle signal corresponding to the detected rotational position. The second-motor rotation angle sensor 16*c* includes two motor rotation angle sensors 16*c*1 and 16*c*2 (see FIG. 2). The first second-motor rotation angle sensor 16*c*1 outputs a first second-motor rotation angle signal. The second second-motor rotation angle sensor 16*c*2 outputs a second second-motor rotation angle signal.

The first steering angle sensor 8 is directly connected to the steering control unit 7 by a dedicated communication line 17. The second steering angle sensor 8 is directly connected to the steering control unit 7 by a dedicated communication line 18. Further, the first operation torque sensor 10 is directly connected to the steering input control unit 6 by a dedicated communication line 19. The second operation torque sensor 11 is directly connected to the steering input control unit 6 by a dedicated communication line 20. Further, the first rack position sensor 14 is directly connected to the steering control unit 7 by a dedicated communication line 21. The second rack position sensor 15 is directly connected to the steering control unit 7 by a dedicated communication line 22.

The steering input control unit 6 and the steering control unit 7 are connected to each other by private CAN communication lines 23 and 24 of two systems. The private CAN communication lines 23 and 24 are dedicated communication lines provided separately from a public CAN communication line (not shown) of the vehicle. The steering input control unit 6 receives the first operation amount signal and the first steering amount signal from the steering control unit 7 through the first private CAN communication line (first dedicated communication line) 23, and receives the second operation amount signal and the second steering amount signal from the steering control unit 7 through the second private CAN communication line (second dedicated communication line) 24. The steering input control unit 6 drives and controls the first electric motor 12 based on the first operation amount signal or the second operation amount signal, the first steering amount signal or the second steering amount signal, the first operation torque signal or the second operation torque signal, and other vehicle states (such as a vehicle speed). When the first steering angle sensor 8 and the second steering angle sensor 9 both fail, the steering input control unit 6 calculates the first operation amount signal and the second operation amount signal based on the first first-motor rotation angle signal or the second first-motor rotation angle signal to drive and control the first electric motor 12 based on the calculated signals, and outputs the first operation amount signal and the second operation amount signal that have been calculated to the steering control unit 7.

As a steering control device for the steering mechanism 4, the steering control unit 7 drives and controls the second electric motor 16 based on the first operation amount signal or the second operation amount signal, the first steering amount signal or the second steering amount signal, and other vehicle states (such as a vehicle speed). When the first rack position sensor 14 and the second rack position sensor 15 both fail, the steering control unit 7 controls the second electric motor 16 based on the first operation amount signal and the second operation amount signal that have been calculated by the steering input control unit 6 based on the first second-motor rotation angle signal and the second second-motor rotation angle signal.

The steering input control unit 6 and the steering control unit 7 receive electric power from a first battery 25 and a second battery 26. The first electric motor 12, the first operation torque sensor 10, and the second operation torque sensor 11 receive electric power from the steering input control unit 6. The second electric motor 16, the first steering angle sensor 8, the second steering angle sensor 9, the first rack position sensor 14, and the second rack position sensor 15 receive electric power from the steering control unit 7.

Figure 2:
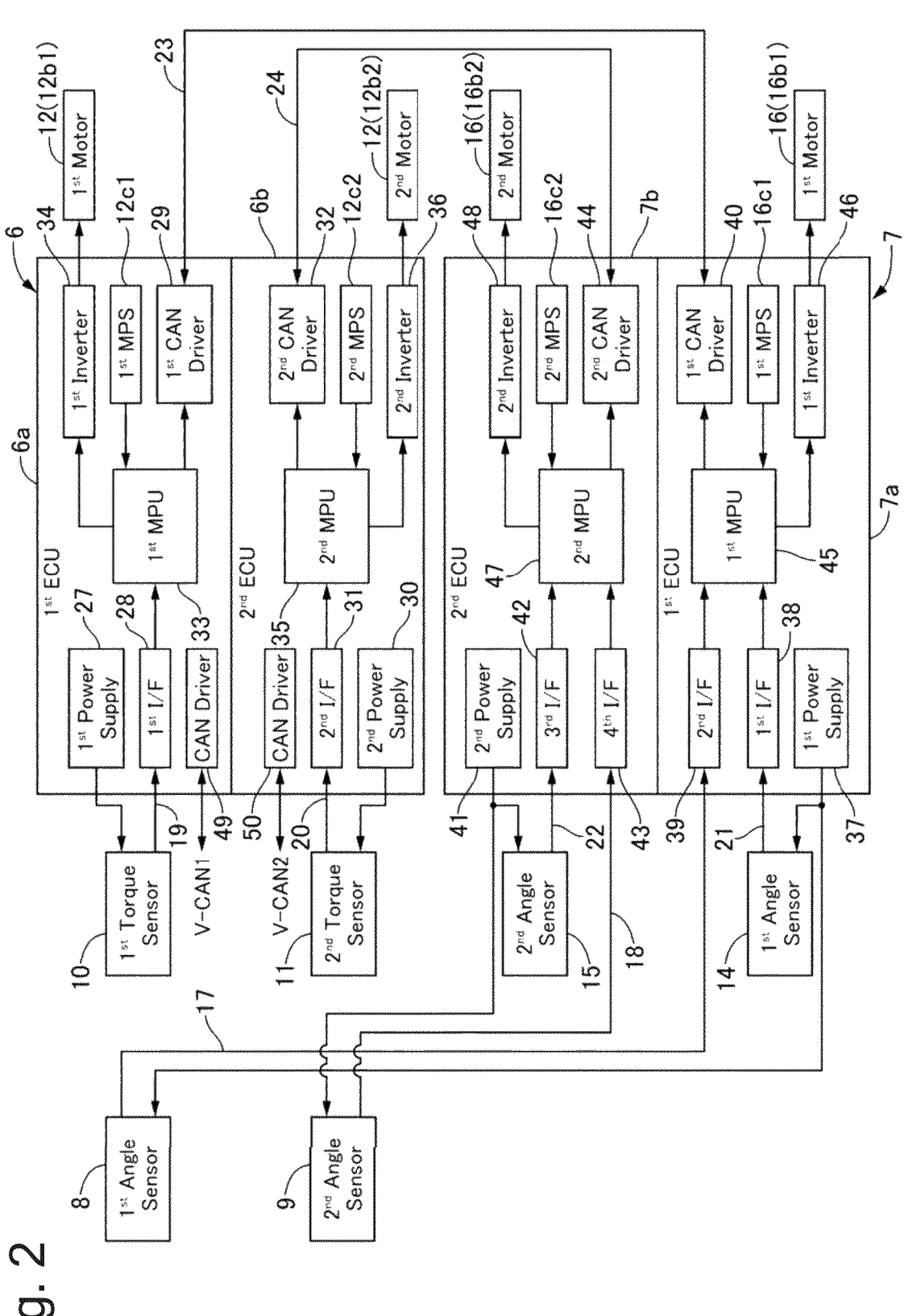
FIG. 2 is a circuit block diagram of the steering device 1 according to the first embodiment.

FIG. 2 is a circuit block diagram of the steering device 1 according to the first embodiment.

First, a configuration of the steering input control unit 6 is described.

The steering input control unit 6 includes a first steering input control unit 6*a* and a second steering input control unit 6*b*.

The first steering input control unit 6*a* includes a first power supply 27, a first interface 28, a first CAN driver 29, a first first-motor rotation angle sensor 12*c*1, a first microprocessor 33, and a first inverter 34.

The second steering input control unit 6*b* includes a second power supply 30, a second interface 31, a second CAN driver 32, a second first-motor rotation angle sensor 12*c*2, a second microprocessor 35, and a second inverter 36.

The first power supply 27 creates a power supply for the first operation torque sensor 10, and supplies electric power thereto. The first power supply 27 is connected to the first battery 25. The first interface 28 decodes the first operation torque signal received from the first operation torque sensor 10. The first CAN driver 29 performs CAN communication to/from a first CAN driver 40 of the steering control unit 7 through the first private CAN communication line 23.

The second power supply 30 creates a power supply for the second operation torque sensor 11, and supplies electric power thereto. The second power supply 30 is connected to the second battery 26. The second interface 31 decodes the second operation torque signal received from the second operation torque sensor 11. The second CAN driver 32 performs CAN communication to/from a second CAN driver 44 of the steering control unit 7 through the second private CAN communication line 24.

The first microprocessor 33 receives input of the first operation torque signal from the first interface 28 and input of the first steering amount signal and the first operation amount signal from the first CAN driver 29, and outputs a first reaction force actuator drive signal for driving and controlling the first electric motor 12. The first microprocessor 33 also outputs the first operation torque signal to the first CAN driver 29. The first inverter 34 converts DC power supplied from the first battery 25 into AC power based on the first reaction force actuator drive signal, and supplies the AC power to a first coil 12b1 of the first stator 12b of the first electric motor 12. A first public CAN driver (vehicle communication part) 49 performs CAN communication to/from other ECUs and sensors in the vehicle through a first public CAN communication line (not shown).

The second microprocessor 35 receives input of the second operation torque signal from the second interface 31 and input of the second steering amount signal and the second operation amount signal from the second CAN driver 32, and outputs a second reaction force actuator drive signal for driving and controlling the first electric motor 12. The second microprocessor 35 also outputs the second operation torque signal to the second CAN driver 32. The second inverter 36 converts DC power supplied from the second battery 26 into AC power based on the second reaction force actuator drive signal, and supplies the AC power to a second coil 12b2 of the first stator 12b of the first electric motor 12. The second public CAN driver (vehicle communication part) 50 performs CAN communication to/from other ECUs and in-vehicle sensors in the vehicle through a second public CAN communication line (not shown).

Next, a configuration of the steering control unit 7 is described.

The steering control unit 7 includes a first steering actuator control unit 7a and a second steering actuator control unit 7b.

The first steering actuator control unit 7a includes a first power supply 37, a first interface 38, a second interface 39, the first CAN driver 40, the first second-motor rotation angle sensor 16c1, a first microprocessor 45, and a first inverter 46.

The second steering actuator control unit 7b includes a second power supply 41, a third interface 42, a fourth interface 43, the second CAN driver 44, the second second-motor rotation angle sensor 16c2, a second microprocessor 47, and a second inverter 48.

The first power supply 37 creates power supplies for the first steering angle sensor 8 and the first rack position sensor 14, and supplies electric power thereto. The first power supply 37 is connected to the first battery 25. The first interface 38 decodes the first steering amount signal received from the first rack position sensor 14. The second interface 39 decodes the first operation amount signal received from the first steering angle sensor 8. The first CAN driver 40 performs CAN communication to/from the first CAN driver 29 of the steering input control unit 6 through the first private CAN communication line 23.

The second power supply 41 creates power supplies for the second steering angle sensor 9 and the second rack position sensor 15, and supplies electric power thereto. The second power supply 41 is connected to the second battery 26. The third interface 42 decodes the second steering amount signal received from the second rack position sensor 15. The fourth interface 43 decodes the second operation amount signal received from the second steering angle sensor 9. The second CAN driver 44 performs CAN communication to/from the second CAN driver 32 of the steering input control unit 6 through the second private CAN communication line 24.

The first microprocessor 45 receives input of the first steering amount signal from the first interface 38 and input of the first operation amount signal from the second interface 39, and outputs a first steering actuator drive signal that drives and controls the second electric motor 16. The first microprocessor 45 also outputs the first steering amount signal and the first operation amount signal to the first CAN driver 40. The first inverter 46 converts DC power supplied from the first battery 25 into AC power based on the first steering actuator drive signal, and supplies the AC power to a first coil (first steering actuator part) 16b1 of the second stator 16b of the second electric motor 16.

The second microprocessor 47 receives input of the second steering amount signal from the third interface 42 and input of the second operation amount signal from the fourth interface 43, and outputs a second steering actuator drive signal that drives and controls the second electric motor 16. The second microprocessor 47 also outputs the second steering amount signal and the second operation amount signal to the second CAN driver 44. The second inverter 48 converts DC power supplied from the second battery 26 into AC power based on the second steering actuator drive signal, and supplies the AC power to a second coil (second steering actuator part) 16b2 of the second stator 16b of the second electric motor 16.

The steering input control unit 6 in the first embodiment includes the two microprocessors 33 and 35. Therefore, even when one of the microprocessors fails, the other microprocessor can drive and control the first electric motor 12, and reaction force control can be continued. Meanwhile, the steering control unit 7 includes the two microprocessors 45 and 47. Therefore, even when one of the microprocessors fails, the other microprocessor can drive the second electric motor 16, and steering control can be continued.

Next, the action and effect of the first embodiment are described.

In a related-art steering device, a first steering angle sensor outputs a first operation amount signal to a first microprocessor of a steering input control unit, and a second steering angle sensor outputs a second operation amount signal to a second microprocessor of a steering control unit. A first microprocessor of the steering control unit receives the first operation amount signal from the first microprocessor of the steering input control unit through a two-way communication line. Therefore, in the above-mentioned related art, when a failure (first failure) in which the first operation amount signal cannot be transmitted from the first microprocessor of the steering input control unit to the first microprocessor of the steering control unit occurs and a failure (second failure) in which the second microprocessor of the steering control unit malfunctions also occurs, information on the steering wheel cannot be transmitted to the first microprocessor of the steering control unit, thereby causing a problem in that steering control cannot be continued even when one system of the steering control unit is operating normally.

In contrast, in the steering device 1 according to the first embodiment, the first steering angle sensor 8 outputs the first operation amount signal to the first steering actuator control unit 7a of the steering control unit 7, and the second steering angle sensor 9 outputs the second operation amount signal to the second steering actuator control unit 7b of the steering control unit 7. For this reason, even when a failure (first failure) in which information cannot be transmitted from the first microprocessor 33 of the steering input control unit 6 to the first microprocessor 45 of the steering control unit 7 occurs and a failure (second failure) in which the second microprocessor 47 of the steering control unit 7 malfunctions also occurs, the first microprocessor 45 of the steering control unit 7 can receive the first operation amount signal from the first steering angle sensor 8, and the steering control can be continued based on the first operation amount signal.

FIG. 3 is a table for showing control states of the steering mechanism 4 at times of occurrence of the first failure and the second failure in the steering device 1 according to the first embodiment.

(First Failure)

When a failure occurs in the first microprocessor ($1^{st}$ MPU) 33 or the second microprocessor ($2^{nd}$ MPU) 35 of the steering input control unit 6, the first microprocessor (1st MPU) 45 and the second microprocessor (2nd MPU) 47 can receive the first operation amount signal and the second operation amount signal from the first steering angle sensor 8 and the second steering angle sensor 9, thereby enabling the steering control to be performed through two systems.

(Second Failure)

In addition to the above-mentioned first failure, when a failure occurs in the second microprocessor 35 or the first microprocessor 35 of the steering input control unit 6, the first microprocessor 45 and the second microprocessor 47 can receive the first operation amount signal and the second operation amount signal from the first steering angle sensor 8 and the second steering angle sensor 9, thereby enabling the steering control to be continued through two systems.

Meanwhile, when a failure occurs in the first microprocessor 45 or the second microprocessor 47 of the steering control unit 7, one of the second microprocessor 47 or the first microprocessor 45 can receive the second operation amount signal or the first operation amount signal, thereby enabling the steering control to be continued through one system.

As described above, the steering device 1 according to the first embodiment exhibits a remarkable action and effect of being able to continue the steering control of the front wheels 3 when one of the microprocessors on the steering control unit 7 side operates normally at a time of occurrence of a double failure.

The first steering angle sensor 8 is supplied with electric power from the first steering actuator control unit 7a, and the second steering angle sensor 9 is supplied with electric power from the second steering actuator control unit 7b. Thus, even when power supply circuits of the first steering input control unit 6a and the second steering input control unit 6b fail, electric power can be supplied to the first steering angle sensor 8 and the second steering angle sensor 9, and hence the first operation amount signal and the second operation amount signal can be continuously output, thereby enabling the steering control to be continued.

The first rack position sensor 14 outputs the first steering amount signal to the first steering actuator control unit 7a, and the second rack position sensor 15 outputs the second steering amount signal to the second steering actuator control unit 7b. Thus, even when the first steering input control unit 6a and the second steering input control unit 6b fail, the first steering actuator control unit 7a and the second steering actuator control unit 7b can receive the first steering amount signal and the second steering amount signal and can grasp the state of the front wheels 3, thereby enabling the steering control to be continued.

The first steering actuator control unit 7a is supplied with electric power from the first battery 25, and the second steering actuator control unit 7b is supplied with electric power from the second battery 26. That is, power supply parts that respectively supply electric power to the first steering actuator control unit 7a and the second steering actuator control unit 7b are independently provided. Thus, even when one of the first battery 25 or the second battery 26 fails, one of the first steering actuator control unit 7a or the second steering actuator control unit 7b can be supplied with electric power from a normal battery, thereby enabling the steering control to be continued.

The steering input control unit 6a outputs the first operation amount signal calculated based on the first first-motor rotation angle signal detected by the first first-motor rotation angle sensor 12c1 to the first steering actuator control unit 7a, and outputs the second operation amount signal calculated based on the second first-motor rotation angle signal detected by the second first-motor rotation angle sensor 12c2 to the second steering actuator control unit 7b. Thus, even when both the first steering angle sensor 8 and the second steering angle sensor 9 fail, the steering control unit 7 can grasp the state of the steering wheel 2, thereby enabling the steering control to be continued.

The first steering input control unit 6a and the second steering input control unit 6b are provided with the first public CAN driver 49 and the second public CAN driver 50, respectively, for communicating to/from other control devices in the vehicle. The first steering input control unit 6a and the first steering actuator control unit 7a are provided therebetween with the first private CAN communication line 23 for mutual communication, and the second steering input control unit 6b and the second steering actuator control unit 7b are provided therebetween with the second private CAN communication line 24 for mutual communication. Thus, the first steering input control unit 6a and the second steering input control unit 6b can receive the first steering amount signal and the second steering amount signal through the first private CAN communication line 23 and the second private CAN communication line 24, and can also transmit the first steering amount signal and the second steering amount signal to other ECUs through the first public CAN driver 49 and the second public CAN driver 50.

When the steering input control unit 6 fails, the steering control unit 7 causes the first steering actuator control unit 7a to control the first coil 16b1 based on the first operation amount signal output from the first steering angle sensor 8, and causes the second steering actuator control unit 7b to control the second coil 16b2 based on the second operation amount signal output from the second steering angle sensor 9. Therefore, even when the steering input control unit 6 fails, the steering control unit 7 can acquire the first operation amount signal and the second operation amount signal, thereby enabling the steering control corresponding to the rotation amount of the steering wheel 2, that is, the steering control corresponding to a steering intention of the driver.

When the steering input control unit 6 fails, the steering control unit 7 continues control in a first failure control mode of driving the first coil 16*b*1 and the second coil 16*b*2, and when the first steering actuator control unit 7*a* or the second steering actuator control unit 7*b* fails, the steering control unit 7 continues control in a second failure control mode of driving any one of the first coil 16*b*1 or the second coil 16*b*2. Thus, even when the steering input control unit 6 fails (first failure), it is possible to continue the steering control by a redundant configuration. In addition, even when the first steering actuator control unit 7*a* or the second steering actuator control unit 7*b* fails (second failure), one of the first coil 16*b*1 or the second coil 16*b*2 can be controlled, thereby enabling the steering control to be continued.

Other Embodiments

The embodiment for carrying out the present invention has been described above. However, the specific configuration of the present invention is not limited to the configuration of the embodiment. A change in design and the like without departing from the gist of the invention are also encompassed in the present invention.

As a steering input mechanism, a configuration in which the steering reaction force is applied through use of a spring reaction force instead of including a reaction force actuator may be employed.

The first operation amount sensor and the second operation amount sensor may be supplied with electric power not only from the power supply circuit of the steering control unit but also from an independent power supply circuit other than the power supply circuit of the steering input control unit.

As the steering actuator, a steering actuator of another type, such as a rack-assist type or a dual pinion type, may be employed.

The present application claims a priority based on Japanese Patent Application No. 2022-105701 filed on Jun. 30, 2022. All disclosed contents including Specification, Scope of Claims, Drawings, and Abstract of Japanese Patent Application No. 2022-105701 filed on Jun. 30, 2022 are incorporated herein by reference in their entirety.

REFERENCE SIGNS LIST

1 . . . steering device, 2 . . . steering wheel (operation input member), 3 . . . front wheel (steered wheel), 4 . . . steering mechanism, 5 . . . steering input mechanism, 6 . . . steering input control unit, 7 . . . steering control unit, 7*a* . . . first steering actuator control unit, 7*b* . . . second steering actuator control unit, 8 . . . first steering angle sensor (first operation amount sensor), 9 . . . second steering angle sensor (second operation amount sensor), 13 . . . rack bar (steering member), 16 . . . second electric motor (steering actuator)

The invention claimed is:

1. A steering device, comprising:
a steering input mechanism configured to detect operation information on steering; and
a steering mechanism configured to apply a steering angle to a steered wheel, wherein the steering input mechanism includes:
   a steering operation input member;
   a first operation amount sensor configured to output a first operation amount signal based on an operation of the steering operation input member;
   a second operation amount sensor configured to output a second operation amount signal based on an operation of the steering operation input member; and
   a steering input control unit configured to output an operation amount signal based on an operation amount of the steering operation input member,
wherein the steering mechanism includes:
   a steering member connected to the steered wheel;
   a steering actuator including a first steering actuator part and a second steering actuator part that are configured to apply a torque to the steering member; and
   a steering control unit configured to output a drive signal to the steering actuator based on the operation amount signal received from the steering input control unit,
wherein the steering control unit includes:
   a first steering actuator control unit configured to control the first steering actuator part; and
   a second steering actuator control unit configured to control the second steering actuator part,
wherein:
the first operation amount sensor is configured to output the first operation amount signal to the first steering actuator control unit;
the second operation amount sensor is configured to output the second operation amount signal to the second steering actuator control unit;
the first operation amount sensor is configured to be supplied with electric power from the first steering actuator control unit; and
the second operation amount sensor is configured to be supplied with electric power from the second steering actuator control unit.

2. The steering device according to claim 1, wherein the steering mechanism further includes:
   a first steering amount sensor configured to detect a steering amount of the steering member; and
   a second steering amount sensor configured to detect a steering amount of the steering member,
wherein:
the first steering amount sensor is configured to output a first steering amount signal to the first steering actuator control unit; and
the second steering amount sensor is configured to output a second steering amount signal to the second steering actuator control unit.

3. The steering device according to claim 2, wherein the steering control unit is independently provided with power supply parts configured to respectively supply electric power to the first steering actuator control unit and the second steering actuator control unit.

4. The steering device according to claim 1, wherein each of the first operation amount sensor and the second operation amount sensor is a rotation angle sensor configured to detect a rotation amount of the steering operation input member.

5. The steering device according to claim 1, wherein the steering input mechanism further includes:
   a reaction force actuator configured to apply a torque corresponding to the operation amount of the steering operation input member;

a first rotation amount sensor configured to detect a rotation amount of the reaction force actuator; and a second rotation amount sensor configured to detect a rotation amount of the reaction force actuator, and wherein the steering input control unit is further configured to:

output the first operation amount signal calculated based on the rotation amount of the reaction force actuator, which has been detected by the first rotation amount sensor, to the first steering actuator control unit; and output the second operation amount signal calculated based on the rotation amount of the reaction force actuator, which has been detected by the second rotation amount sensor, to the second steering actuator control unit.

6. The steering device according to claim 2, wherein the steering input control unit includes:

a first steering input control unit; and a second steering input control unit, wherein:

each of the first steering input control unit and the second steering input control unit is provided with a vehicle communication part for communicating to or from another control device in a vehicle;

the first steering input control unit and the first steering actuator control unit are provided therebetween with a first dedicated communication line for mutual communication; and the second steering input control unit and the second steering actuator control unit are provided therebetween with a second dedicated communication line for mutual communication.

7. The steering device according to claim 6, wherein the steering control unit is configured to:

output the first steering amount signal output by the first steering amount sensor from the first steering actuator control unit to the first steering input control unit through the first dedicated communication line; and output the second steering amount signal output by the second steering amount sensor from the second steering actuator control unit to the second steering input control unit through the second dedicated communication line.

8. The steering device according to claim 1, wherein the steering control unit is configured to, when the steering input control unit fails:

cause the first steering actuator control unit to control the first steering actuator part based on the first operation amount signal output from the first operation amount sensor; and cause the second steering actuator control unit to control the second steering actuator part based on the second operation amount signal output from the second operation amount sensor.

9. The steering device according to claim 1, wherein the steering control unit is configured to:

continue, when the steering input control unit fails, control in a first failure control mode of driving the first steering actuator part and the second steering actuator part; and continue, when the first steering actuator control unit or the second steering actuator control unit fails, control in a second failure control mode of driving any one of the first steering actuator part or the second steering actuator part.

10. A steering control device, which can be provided to a steering device including a steering input mechanism configured to detect operation information on steering and a steering mechanism configured to apply a steering angle to a steered wheel, the steering control device comprising:

a first steering actuator control unit configured to control a first steering actuator part configured to apply a torque to a steering member provided to the steering mechanism; and a second steering actuator control unit configured to control a second steering actuator part configured to apply a torque to the steering member, wherein:

the first steering actuator control unit is configured to receive a first operation amount signal from a first operation amount sensor provided to the steering input mechanism and configured to output the first operation amount signal based on an operation of a steering operation input member of the steering input mechanism;

the second steering actuator control unit is configured to receive a second operation amount signal from a second operation amount sensor provided to the steering input mechanism and configured to output the second operation amount signal based on an operation of the steering operation input member of the steering input mechanism;

the first steering actuator control unit is configured to supply electric power to the first operation amount sensor; and the second steering actuator control unit is configured to supply electric power to the second operation amount sensor.

* * * * *